Patented Mar. 2, 1943

2,312,320

UNITED STATES PATENT OFFICE 2,312,320

RESINOUS PRODUCT OF ALDEHYDES AND GUANAZO DIAZINES

Gaetano F. D'Alelio and James W. Underwood, Pittsfield, Mass., assignors to General Electric Company, a corporation of New York No Drawing. Application September 27, 1941, Serial No. 412,692

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

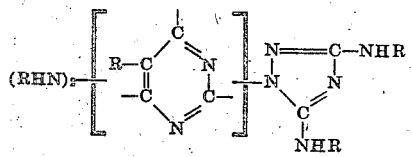

In the above formula R represents a member of the class consisting of hydrogen and monovalent hydrocarbon and halohydrocarbon radicals, numerous examples of which are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, napththyl, etc.); aliphatic-substituted aryl (e. g., tolyl, exylyl, ethylphenyl, propylphenyl, allylphenyl, isopropylphenyl, 2-butenyl-phenyl, tertiary-butylphenyl, etc.); aryl-substituted aliphatic (e. g., benzyl, phenylethyl, phenylpropyl, cinnamyl, phenylisopropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethylchlorphenyl, phenylchlorethyl, brompropyl, bromtolyl, etc. Preferably R in the above formula is hydrogen. Also especially suitable for use in carrying the present invention into effect are diazine derivatives corresponding to the general formula:

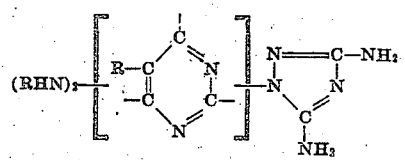

where R is a member of the class consisting of hydrogen and monovalent hydrocarbon and halohydrocarbon radicals.

Instead of the guanazo 1,3- or meta-diazines (guanazo pyrimidines) represented by the above formulas, the corresponding 1,2- or ortho-diazines (pyridazines) or the 1,4- or para-diazines (pyrazines) may be used. Also, instead of the guanazo diamino [(NHR)₂] diazines represented by the above formulas, the di- and tri-guanazo diazines (ortho, meta or para) may be employed.

The diazine derivatives that are used in carrying the present invention into effect are more fully described and are specifically claimed in our copending application Serial No. 412,963, filed concurrently herewith, now Patent No. 2,295,566, issued September 15, 1942, and assigned to the same assignee as the present invention. As pointed out in this copending application, the mono-guanazo diazines can be prepared by effecting reaction between a mono-hydrazino diamino [(—NHR)₂] diazine and dicyandiamide (cyanoguanidine). This reaction advantageously may be carried out in an aqueous medium and preferably in the presence of one mol of inorganic acid (e. g., hydrochloric, hydrobromic, sulfuric, etc.) for each mol of hydrazino diazine. The acid may be present in the form of an inorganic acid mono salt of the hydrazino diazine. If desired, biguanide (guanylguanidine) may be used in place of dicyandiamide. In such event it is preferable either to use two mols of inorganic acid for each mol of hydrazino diamino diazine or to use the inorganic acid mono salt of both the biguanide and the hydrazino diazine, since two mols of ammonia will be liberated. For the preparation of guanazo diazines in which the substituent groups attached to the carbon atoms of the guanazo radical are —NHR groups, several methods may be used. One suitable method involves the reaction of substituted cyanoguanidines (e. g., N-phenyl N'-cyano guanidine) or substituted guanylguanidines (e. g., N-phenyl N'-guanylguanidine) with the hydrazino diazine. Another method involves the amminolysis of the —NH₂ groups attached to the carbon atoms of the guanazo radical with a primary amine (e. g., aniline, methyl amine) so that the —NH₂ groups are replaced by —NHR groups, where R is a hydrocarbon radical corresponding to the hydrocarbon radical of the primary amine.

Specific examples of guanazo diazines that may be used in producing our new condensation products are listed below:

4-guanazo 2,6-diamino 1,3-diazine (6-guanazo 2,4-diamino 1,3-diazine)
2-guanazo 4,6-diamino 1,3-diazine
4-guanazo 2,6-di-(methylamino) 1,3-diazine
4-guanazo 2,6-di-(anolino) 1,3-diazine
4-guanazo 2-methylamino 6-amino 1,3-diazine
4-guanazo 2-propylamino 6-anilino 1,3-diazine
4-guanazo 2,6-di-(anolino) 1,3-diazine
4-guanazo 2-toluido 6-cyclohexylamino 1,3-diazine
4-guanazo 2,6-di-(chloranilino) 1,3-diazine
4-guanazo 2-butylamino 5-phenyl 6-pentylamino 1,3 diazine
4-guanazo 2-benzylamino 5-ethyl 6-naphthylamino 1,3-diazine
2-guanazo 4,6-di-(chlorbutylamino) 5-cyclohexyl 1,3-diazine
4-guanazo 2,6-diamino 5-chlortolyl 1,3 diazine
4-guanazo 2,6-diamino 5-benzyl 1,3-diazine
2-guanazo 4,6-di-(methylamino) 1,3-diazine
2-guanazo 4,6-di-(ethylamino) 1,3-diazine
2-guanazo 4,6-di-(propylamino) 1,3-diazine
2-guanazo 4,6-di-(isopropylamino) 1,3-diazine
4-guanazo 2,6-di-(butylamino) 1,3-diazine
4-guanazo 2,6-di-(ethylamino) 5-cyclohexyl 1,3-diazine
4-guanazo 2,6-diamino 5-chlorethyl 1,3-diazine
4-guanazo 2-chlormethylamino 6-amino 1,3-diazine
4-guanazo 2,6-di-(cyclohexylamino) 1,3-diazine
4-guanazo 2,6-diamino 5-methyl 1,3-diazine
4-guanazo 2,6-diamino 5-ethyl 1,3-diazine
2-guanazo 4,6-diamino 5-methyl 1,3-diazine
2-guanazo 4,6-diamino 5-phenyl 1,3-diazine
4-guanazo 6-methylamino 2-amino 1,3-diazine
4-guanazo 6-ethylamino 5-methyl 2-amino 1,3-diazine
2-guanazo 4-ethylamino 6-propylamino 5-naphthyl 1,3-diazine
4-guanazo 2,6-di-(chlornaphthylamino) 1,3-diazine The formulas for many of the above compounds are shown in our above-identified copending application Serial No. 412,693.

The present invention is based on our discovery that new and valuable materials of particular utility in the plastics and coating arts can be produced by effecting reaction between ingredients comprising essentially an aldehyde, including polymeric aldehydes and aldehyde-addition products, and diazines (more particularly the 1,3-diazines) containing a guanazo radical,

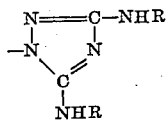

attached directly to a carbon atom of the diazine nucleus.

Resins heretofore have been made by condensing an aldehyde with certain aminodiazines, e. g., 2,4-6-triamino 1,3-diazine. Such known resins have excellent heat and water resistance, but are deficient in other properties that are desirable in a resin to be used in the production of molding compounds and molded articles. The urea-aldehyde and the substituted urea-aldehyde resins (e. g., dicyandiamide-aldehyde and guanyl-guanidine-aldehyde condensation products), on the other hand, have much better flow characteristics than resinous condensation products of an aldehyde with an aminodiazine such as 2,4,6-triamino 1,3-diazine, but are less resistant to water. The resinous condensation products of the present invention have a high water resistance approximating that of the known aminodiazine-aldehyde resins plus the improved flow characteristics of the resinous condensation products of an aldehyde with urea, thiourea or iminourea or substituted ureas, thioureas or iminoureas. The heat resistance of our new resins also is much better than that of the urea-aldehyde or substituted urea-aldehyde resins.

Thus it is seen that the present invention provides a resinous composition which has combined therein the desirable properties of the conventional aminodiazine-aldehyde and urea- and substituted urea-aldehyde resins without sacrifice of other useful properties. This is a surprising and unexpected result that in no way could have been predicted. Because of the unique properties of the resins of this invention, they are suitable for molding and other applications for which the ordinary aminodiazine-aldehyde and urea- and substituted urea-aldehyde resins are unsuited.

In practicing our invention the initial condensation reaction may be carried out at normal or at elevated temperatures, at atmospheric, sub-atmospheric or super-atmospheric pressures and under neutral, alkaline or acid conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tricresyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the guanazo diazine, e. g., 4-guanazo 2,6-diamino 1,3-diazine, 2-guanazo 4,6-diamino 1,3-diazine, 4-guanazo 2,6-di-(ethylamino) 1,3-diazine, etc., may be carried out in the presence of solvents or diluents, fillers, other natural or synthetic resinous bodies, or while admixed with other materials that also can react with the aldehydic reactant or with the diazine derivative, e. g., ketones, urea, thiourea, selenourea, iminourea (guanidine), substituted ureas, thioureas, selenoureas and iminoureas, numerous examples of which are given in various copending applications of one of us (Gaetano F. D'Alelio), for instance in D'Alelio copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the guanazo diazines constituting the primary components of the resins of the present invention, e. g., 2,4,6-triamino 1,3-diazine, etc.; aminotriazines, e. g., melamine, ammeline, ammelide, numerous other examples being given in various D'Alelio copending applications, for instance in application Serial No. 377,524, filed February 5, 1941, and in applications referred to in said copending application; ureido and thioureido triazines, specifically the ureido and thioureido 1,3,5-triazines, numerous examples of which are given in D'Alelio copending application Serial No. 404,661, filed July 30, 1941; semicarbazido and thiosemicarbazido triazines, more particularly the semicarbazido and thiosemicarbazido 1,3,5-triazines, numerous examples of which are given in our copending application Serial No. 409,023, filed August 30, 1941; phenol and substituted phenols, e. g., the cresols, the xylenols, the tertiary alkyl phenols and other phenols such as mentioned in D'Alelio patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactant may be incorporated with the guanazo diazine and the aldehyde by mixing all the reactants and effecting condensation therebetween or by various permutations of reactants as described, for example, in D'Alelio copending application Serial No. 363,037 with particular reference to reactions involving a urea, an aldehyde and a semi-amide of oxalic acid. For instance, we may form a partial condensation product of ingredients comprising urea or melamine, a guanazo diazine of the kind herein described (for example, 2-guanazo 4,6-diamino 1,3-diazine, 4-guanazo 2,6-diamino 1,3-diazine, etc.) and an aldehyde, including polymeric aldehydes and aldehyde-addition products, for instance formaldehyde, paraformaldehyde, dimethylol urea, trimethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention have excellent flow characteristics during a short curing cycle. This is a property that is particularly desirable in a molding compound. The molded articles have good surface finish and excellent resistance to water and arcing. They have a high dielectric strength.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents such as glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated materials and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 4-guanazo 2,6-diamino 1,3-diazine | 75.5 |
| Aqueous formaldehyde (approx. 37.1% HCHO) | 162.0 |
| Aqueous ammonia (approx. 28% NH$_3$) | 7.5 |
| Sodium hydroxide in 5 parts water | 0.1 | were heated together under reflux at the boiling temperature of the mass for 15 minutes to yield a clear, colorless syrup. When a small sample of this syrup was heated on a 140° C. hotplate, it bodied to a thermoelastic resin. The addition of direct (active) or latent curing catalysts or intercondensation with curing reactants caused the syrupy condensation product to convert to a hard, infusible resin upon heating on a 140° C. hotplate.

One (1) part of a curing reactant, specifically chloracetamide (monochloracetamide), was mixed with the above syrup and heating under reflux was continued for an additional 5 minutes to cause the chloracetamide to intercondense with the partial condensation product of the guanazo diazine and formaldehyde. The resulting syrup was divided into two equal portions. A cellulose-filled molding (moldable) compound was made from the one portion by mixing therewith 35 parts alpha cellulose in flock form and 0.2 part of a mold lubricant, specifically zinc stearate. The other portion was mixed with 90 parts asbestos and 0.2 part zinc stearate. The wet molding compounds were dried at 60° C., the cellulose-filled compound for 1½ hours and the asbestos-filled compound for 3 hours. Samples of each of the dried compounds were molded for 4 minutes at 130° C. under a pressure of 2,000 pounds per square inch. In both cases the molded pieces were well cured throughout and showed excellent plastic flow during molding. When tested for its water resistance by immersing in boiling water for 15 minutes followed by immersion in cold water for 5 minutes, the cellulose-filled molded article showed only 0.76% by weight of water absorbed. The molded piece was not visibly affected in any way by this test.

Instead of using chloracetamide as above described in accelerating the curing of the potentially reactive resinous material, heat-convertible compositions may be produced by adding to the syrup direct or active curing catalysts (e. g., citric acid, phthalic acid, malonic acid, oxalic acid, etc.), or latent curing catalysts (e. g., sodium chloracetate, N-diethyl chloracetamide, glycine ethyl ester hydrochloride, etc.) or by intercondensation with curing reactants other than monochloracetamide (e. g., di- and tri-chloracetamides, chloracetonitriles, alpha, beta-dibrompropionitrile, aminoacetamide hydrochloride, aminoacetonitrile hydrochloride, ethylene diamine monohydrochloride, ethanolamine hydrochlorides, nitrourea, chloracetone, chloracetyl urea, glycine, sulfamic acid, citric diamide, phenacyl chloride, etc. Other examples of active and latent curing catalysts and of curing reactants that may be employed to accelerate or to effect the curing of the thermosetting or potentially thermosetting resins of this and other examples are given in various D'Alelio copending applications, for instance in copending applications Serial No. 346,962, filed July 23, 1940, and Serial No. 354,395, filed August 27, 1940, both of which applications are assigned to the same assignee as the present invention.

Example 2

|  | Parts |
|---|---|
| 4-guanazo 2,6-diamino 1,3-diazine | 15.1 |
| Urea | 24.0 |
| Aqueous formaldehyde (approx. 37.1% HCHO) | 81.0 |
| Aqueous ammonia (approx. 28% NH₃) | 1.5 |
| Sodium hydroxide in 2.5 parts water | 0.05 |
| Chloracetamide | 0.5 |

All of the above components with the exception of the chloracetamide were heated together under reflux at boiling temperature for 15 minutes. The chloracetamide was now added and refluxing was continued for an additional 5 minutes. The resulting syrupy condensation product was heat-convertible, as evidenced by the fact that when a small sample of it was heated on a 140° C. hotplate, it cured to an insoluble, infusible resin. A molding compound was made from the syrup by mixing therewith 35 parts alpha cellulose and 0.2 part zinc stearate. The wet compound was dried for 1½ hours at 60° C. A well-cured molded piece that showed good plastic flow during molding was produced by molding a sample of the dried compound at 130° C. under a pressure of 2,000 pounds per square inch.

Example 3

|  | Parts |
|---|---|
| 4-guanazo 2,6-diamino 1,3-diazine | 30.2 |
| Sulfanilamide urea | 43.0 |
| Aqueous formaldehyde (approx. 37.1% HCHO) | 97.2 |
| Aqueous ammonia (approx. 28% NH₃) | 7.0 |
| Sodium hydroxide in 5 parts water | 0.1 |
| Chloracetamide | 0.7 |

All of the above components with the exception of the chloracetamide were heated together under reflux for 15 minutes. The chloracetamide was now added and refluxing was continued for an additional 5 minutes. When a small sample of the resulting syrup was heated on a 140° C. hotplate, it cured to an insoluble, infusible resin. The syrup was now mixed with 50 parts alpha cellulose and 0.4 part zinc stearate to form a molding compound. The wet compound was dried for 1 hour at 60° C. A well-cured molded piece of good surface appearance was obtained by molding a sample of the dried compound for 4 minutes at 130° C. under a pressure of 2,000 pounds per square inch. The molding compound showed excellent flow characteristics during molding.

Example 4

|  | Parts |
|---|---|
| 4-guanazo 2,6-diamino 1,3-diazine | 30.2 |
| Dimethylol urea (commercial grade containing approx. 11% by weight of water) | 72.0 |
| Aqueous ammonia (approx. 28% NH₃) | 7.0 |
| Sodium hydroxide in 5 parts water | 0.1 |
| Water | 150.0 |
| Chloracetamide | 1.0 |

All of the above components with the exception of the chloracetamide were heated together under reflux for 20 minutes. The chloracetamide was now added and heating under reflux was continued for an additional 10 minutes. An insoluble, infusible resin resulted when a small sample of the syrup was heated on a 140° C. hotplate. The syrup was mixed with 70 parts alpha cellulose and 0.4 part zinc stearate to form a molding compound, which thereafter was dried at 60° C. for 2 hours. A sample of the dried compound was molded for 5 minutes at 130° C. under a pressure of 2,000 pounds per square inch. A well-cured molded piece having a glossy surface appearance was obtained. The compound showed excellent plastic flow during molding. The dimethylol urea in the above formula may be replaced in whole or in part by a methylol melamine in equivalent amount, e. g., trimethylol melamine, hexamethylol melamine, etc.

Example 5

|  | Parts |
|---|---|
| 4-guanazo 2,6-diamino 1,3-diazine | 75.5 |
| Acrolein | 112.0 |
| Sodium hydroxide in 5 parts water | 0.1 |
| Water | 100.0 | were heated together under reflux at the boiling temperature of the mass for 15 minutes. During the reaction period there was some precipitation of resin from the solution. When a sample of this precipitated resin was heated on a 140° C. hotplate, it cured to an insoluble, infusible state in the absence of a curing agent. The addition of curing agents such as described under Example 1 accelerated the curing of the heat-curable resin.

Example 6

|  | Parts |
|---|---|
| 4-guanazo 2,6-diamino 1,3-diazine | 75.5 |
| Butyl alcohol | 185.0 |
| Aqueous formaldehyde (approx. 37.1% HCHO) | 162.0 |
| Sodium hydroxide in 5 parts water | 0.1 | were heated together under reflux at the boiling temperature of the mass for 15 minutes, yielding a clear, colorless, syrupy condensation product. A transparent resin soluble in alcohols is produced by concentrating the syrup, for example by heating it at 100° to 120° C. When a sample of the syrup is heated on a 140° C. hotplate, it bodies to a thermoelastic resin. The addition of chloracetamide, sulfamic acid, citric acid, glycine and other curing agents such as described under Example 1, either to the syrupy or dehydrated reaction product, yielded a resinous material that was convertible at temperatures of the order of 140° C. to a heat-hardened, infusible state. The solubility and film-forming characteristics of the alcohol-modified guanazo diazine-formaldehyde condensation product of this example make it especially suitable for use in the production of spirit and baking varnishes. For example, it may be used as a modifier of varnishes of the aminoplast and alkyd-resin types.

Example 7

|   | Parts |
|---|---|
| 4-guanazo 2,6-diamino 1,3-diazine | 75.5 |
| Acetamide | 3.0 |
| Aqueous formaldehyde (approx. 37.1% HCHO) | 202.5 |
| Sodium hydroxide in 5 parts water | 0.1 | were heated together under reflux at boiling temperature for 15 minutes. When a sample of the resulting syrup was heated on a 140° C. hotplate, it bodied to a thermoplastic resin. Heat-curable resinous compositions are produced by incorporating either into the syrupy or dehydrated condensation product chloracetamide or other curing agent such as mentioned under Example 1. The acetamide-modified condensation product of this example may be used advantageously as a modifier of other aminoplasts of unsatisfactory flow characteristics to provide a mixed aminoplast of improved plastic flow.

Example 8

|   | Parts |
|---|---|
| 4-guanazo 2,6-diamino 1,3-diazine | 75.5 |
| Diethyl malonate | 80.0 |
| Aqueous formaldehyde (approx. 37.1% HCHO) | 202.5 |
| Sodium hydroxide in 5 parts water | 0.1 | were heated together under reflux at boiling temperature for 15 minutes, yielding a resin gel. This gel cured to an infusible resin in the absence of a curing agent when a sample of it was heated on a 140° hotplate. The addition of a curing agent such as mentioned under Example 1 accelerated and advanced the cure materially. The cured resin was insoluble in water and organic solvents such, for example, as alcohols, ethers and hydrocarbon solvents.

Example 9

|   | Parts |
|---|---|
| 4-guanazo 2,6-diamino 1,3-diazine | 75.5 |
| Glycerine | 46.0 |
| Aqueous formaldehyde (approx. 37.1% HCHO) | 202.5 |
| Sodium hydroxide in 5 parts water | 0.1 | were heated together under reflux at boiling temperature for 15 minutes, yielding a clear, colorless syrup. This syrup can be dehydrated to yield an alcohol-soluble resin. When a sample of the syrup was heated on a 140° C. hotplate in the absence of a curing agent, it bodied to a thermo-elastic resin. An insoluble and infusible resinous mass is produced when a sample of the syrup is treated with chloracetamide, followed by heating at a temperature of the order of 140° C. Instead of chloracetamide, other curing agents such as mentioned under Example 1 may be incorporated into the syrupy or dehydrated condensation product to provide a heat-convertible material which, under heat, cures to an insoluble, infusible state. The product of this example is especially suitable for use in the production of varnishes and as a modifier of other synthetic resinous materials.

Example 10

|   | Parts |
|---|---|
| 4-guanazo 2,6-diamino 1,3-diazine | 75.5 |
| Polyvinyl alcohol | 132.0 |
| Aqueous formaldehyde (approx. 37.1% HCHO) | 162.0 |
| Sodium hydroxide in 5 parts water | 0.1 |
| Water | 200.0 | were heated together under reflux at boiling temperature for 15 minutes, yielding a thick, colorless syrup. When a sample of this syrup was heated on a 140° C. hotplate, it bodied to a thermoelastic resin. The addition of a small amount of dilute hydrochloric acid, followed by heating on a 140° C. hotplate, caused the dehydrated syrup to cure rapidly to an infusible state. The product of this example advantageously may be used in the production of varnishes and as a modifier of other synthetic resins. Instead of hydrochloric acid, sulfamic acid or other curing agents such as mentioned under Example 1 may be incorporated into the syrupy condensation product or into the dehydrated syrup to accelerate or to effect the conversion of the initial reaction product to an insoluble, an infusible or an insoluble and infusible state.

It will be understood, of course, by those skilled in the art that our invention is not limited to the use of the specific guanazo diazine mentioned in the above illustrative examples and that any other guanazo diazine may be employed in the preparation of the new condensation products of this invention, for example guanazo 1,3-diazines such as hereinbefore specifically mentioned by way of illustration, including 2-guanazo 4,6-diamino 1,3-diazine, 4-guanazo 2,6-di-(methylamino) 1,3-diazine, 4-guanazo 2,6-di-(ethylamino) 1,3-diazine, etc.

In producing our new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in D'Alelio copending application Serial No. 377,524), mono- and poly-(N-carbinol) derivatives of amides of polycarboxylic acides, e. g., maleic, itaconic, fumaric, adipic, malonic, succinic, citric, phthalic, etc., monoand poly-(N-carbinol) derivatives of amidogentriazines, numerous examples of which are given in D'Alelio copending application Serial No. 377,524, etc. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and aldehyde-addition products may be employed, e. g., mixtures of formaldehyde and methylol compounds such, for instance, as dimethylol urea and trimethylol melamine.

The ratio of the aldehydic reactant to the diazine derivative may be varied over a wide range, but the aldehydic component ordinarily is employed in an amount corresponding to at least one mol of the aldehyde, specifically formaldehyde, for each mol of the diazine derivative. Thus we may use, for example, from one to seven or eight or more mols of an aldehyde for each mol of diazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 16 or 18 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloracetonitriles, etc.; acylated ureas, more particularly halogenated acylated ureas of the kind described, for example, in D'Alelio copending applications Serial No. 289,273, filed August 9, 1939, now Patent No. 2,281,559 and Serial No. 400,649, filed July 1, 1941, now Patent No. 2,294,873; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., poly- vinyl acetate, polyvinyl butyrate, etc., polyvinyl ethers, including polyvinyl acetals, specifically polyvinyl formal, etc.

Instead of effecting reaction between a guanazo diazine of the kind herein described and an aldehyde, e. g., formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloracetic, propionic, butyric, valeric, acrylic, polyacrylic, oxalic, methacrylic, polymethacrylic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

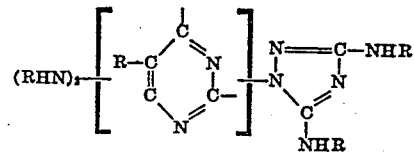

where R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A heat-curable resinous composition comprising the heat-convertible reaction product of ingredients comprising formaldehyde and a compound corresponding to the general formula

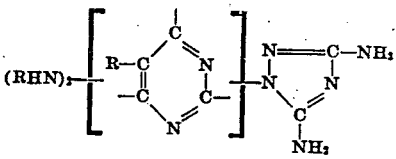

where R is a member of the class consisting of hydrogen and monovalent hydrocarbon and halo-hydrocarbon radicals.

6. A product comprising the heat-cured resinous composition of claim 5.

7. A resinous composition comprising the product of reaction of ingredients comprising 4-guanazo 2,6-diamino 1,3-diazine and an aldehyde.

8. A resinous composition comprising the product of reaction of ingredients comprising 4-guanazo 2,6-diamino 1,3-diazine and formaldehyde.

9. A resinous composition comprising the product of reaction of ingredients comprising 2-guanazo 4,6-diamino 1,3-diazine and formaldehyde.

10. A composition comprising the product of reaction of ingredients comprising a urea, an aldehyde and a compound corresponding to the general formula

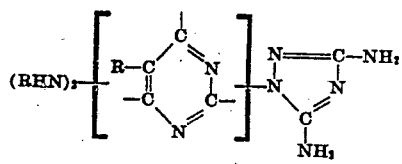

where R is a member of the class consisting of hydrogen and monovalent hydrocarbon and halo-hydrocarbon radicals.

11. A heat-curable resinous composition comprising the heat-convertible reaction product of (1) a partial condensation product of ingredients comprising formaldehyde and a compound corresponding to the general formula

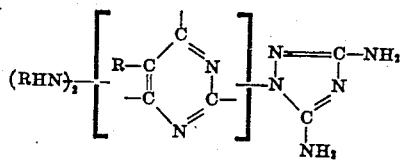

where R represents a member of the class consisting of hydrogen and monovalent hydrocarbon and halo-hydrocarbon radicals, and (2) a curing reactant.

12. A resinous composition as in claim 11 wherein the curing reactant is a chlorinated acetamide.

13. A product comprising the heat-cured composition of claim 11.

14. A resinous composition comprising the product of reaction of (1) a partial condensation product of ingredients comprising urea, 4-guanazo 2,6-diamino 1,3-diazine and formaldehyde and (2) chloracetamide.

15. A resinous composition comprising the product of reaction of (1) a partial condensation product of ingredients comprising melamine, 4-guanazo 2,6-diamino 1,3-diazine and formaldehyde and (2) chloracetamide.

16. A resinous product of reaction of ingredients comprising dimethylol urea and 4-guanazo 2,6-diamino 1,3-diazine.

17. A resinous product of reaction of ingredients comprising trimethylol melamine and 4-guanazo 2,6-diamino 1,3-diazine.

18. A resinous product of reaction of ingredients comprising dimethylol urea, 4-guanazo 2,6-diamino 1,3-diazine and chloracetamide.

19. The method of preparing new condensation products which comprises effecting reaction between ingredients comprising an aldehyde and a compound corresponding to the general formula

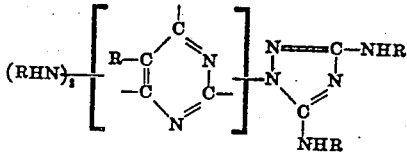

where R represents a member of the class consisting of hydrogen and monovalent hydrocarbon and halo-hydrocarbon radicals.

GAETANO F. D'ALELIO.
JAMES W. UNDERWOOD.

Certificate of Correction

Patent No. 2,312,320. March 2, 1943.

GAETANO F. D'ALELIO ET AL.

It is hereby certified that errors appear in the above numbered patent requiring correction as follows: In the grant, line 6, and in the heading to the printed specification, line 2, title of invention, for "RESINOUS" read *REACTION;* page 1, first column, line 30, for "exylyl" read *xylyl*; and second column, line 15, for the serial number "412,963" read *412,693*; page 2, first column, line 8, for "(anolino)" read *(ethylamino)*; line 11, for "(anolino)" read *(anilino)*; lines 16 and 21, for "1,3 diazine" read *1,3-diazine*; line 66, for "2,4-6-triamino" read *2,4,6-triamino*; page 5, second column, line 74, for "acides" read *acids*; page 6, second column, lines 62–67, claim 1, for that portion of the formula reading

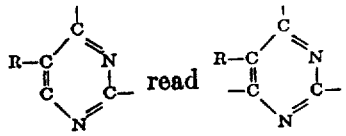

and that the said Letters Patent should be read with these corrections therein that the same may conform to the record of the case in the Patent Office.

Signed and sealed this 27th day of April, A. D. 1943.

.[SEAL]

HENRY VAN ARSDALE,
*Acting Commissioner of Patents.*